Jan. 20, 1931.   C. H. FRANKS   1,789,358
TESTING DEVICE FOR COIL WINDING MACHINES
Filed Nov. 4, 1924
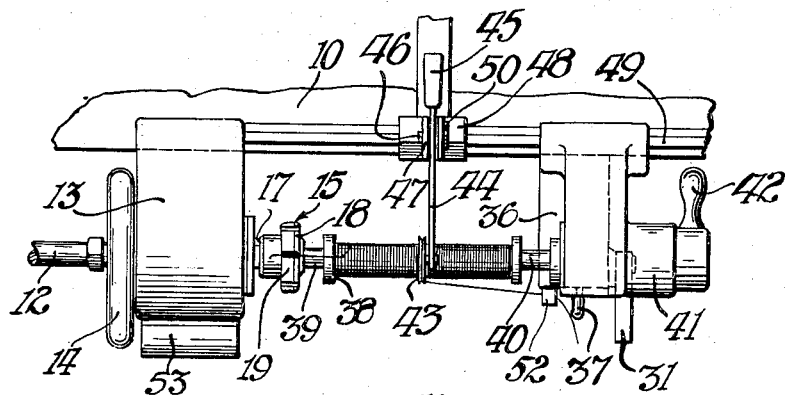
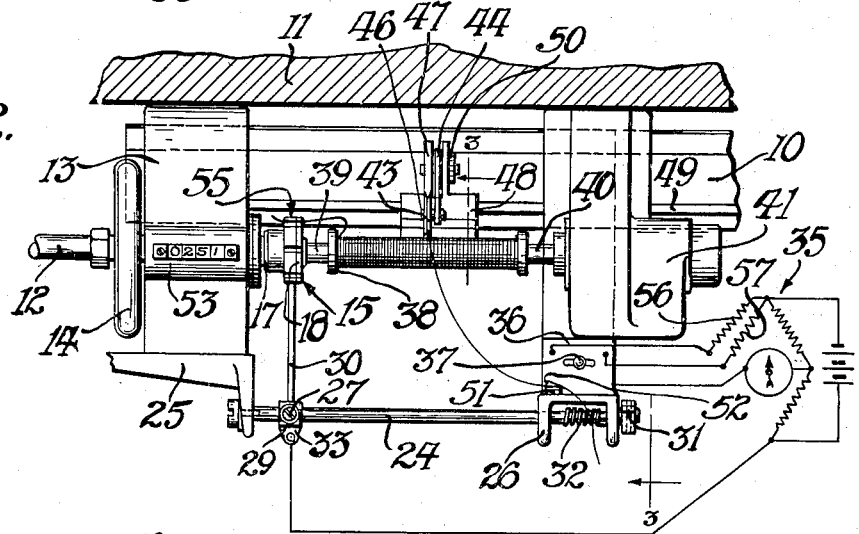
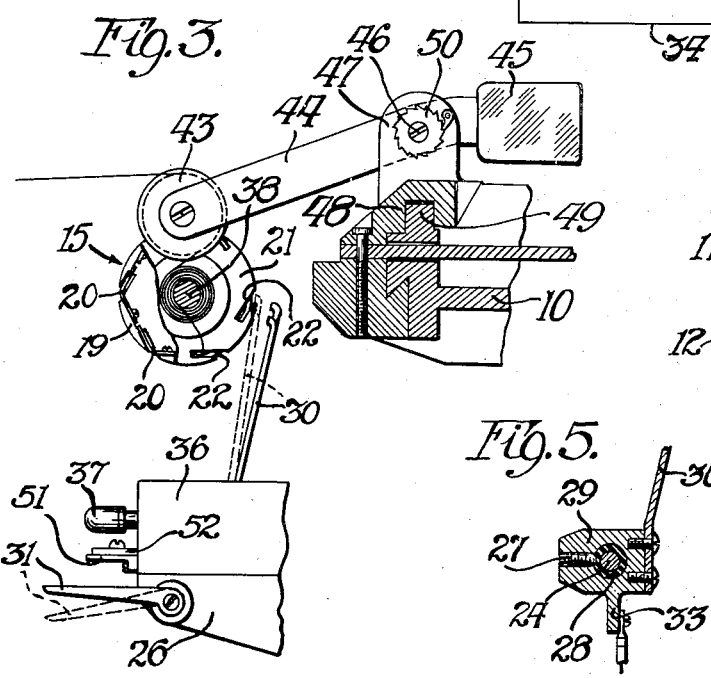
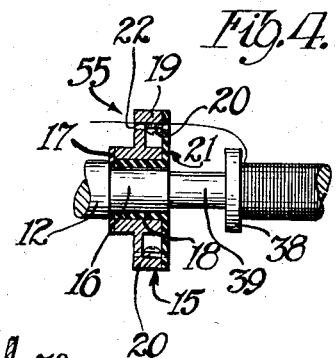
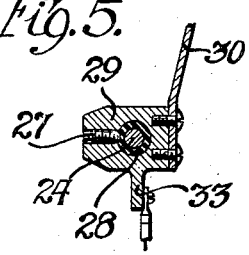
Inventor
Clem H. Franks
by [signature]
Atty.

Patented Jan. 20, 1931

1,789,358

UNITED STATES PATENT OFFICE

CLEM H. FRANKS, OF LA GRANGE, ILLINOIS, ASSIGNOR TO WESTERN ELECTRIC COMPANY, INCORPORATED, OF NEW YORK, N. Y., A CORPORATION OF NEW YORK

TESTING DEVICE FOR COIL-WINDING MACHINES

Application filed November 4, 1924. Serial No. 747,717.

This invention relates to winding machines, and particularly to improvements in a machine for winding coils used in electrical apparatus.

The primary object of the present invention is to provide a coil winding machine with an improved testing device whereby an electrical characteristic of a coil may be readily and accurately determined during the winding operation.

Other objects and advantages will appear in the following detailed description and the novel features of the invention will be particularly pointed out in the appended claims.

In accordance with one embodiment of the invention, a portion of the chuck or core receiving member of a coil winding machine of any well known type is suitably insulated from the framework of the machine and is provided with a plurality of wire retaining and electrical contact members which are electrically connected to a metal rim or commutator ring formed on the periphery thereof. A brush member, suitably insulated from the framework of the machine, is adapted to be brought into electrical contact with the commutator ring by means of a suitable hand rest lever. Before starting to wind a coil the end of the wire is electrically connected to one of the wire retaining members. The coil is then wound in the usual manner, and when it is thought that a sufficient number of turns have been made to give the coil the desired resistance, the outer end of the wire, or the portion leading from the supply spool to the coil, is electrically connected to a metal contact clip which is secured to the framework of the machine and suitably insulated therefrom. The hand rest lever is then operated to cause an electrical connection between the brush member and commutator ring thereby closing an electric bridge circuit in which is connected a galvanometer or other suitable indicating device. If the coil contains the desired resistance, the wire is cut as close to the contact clip as possible and the same operation is repeated to wind the next coil. Any suitable counting mechanism may be provided to assist the operator in determining approximately when a sufficient number of turns of wire has been wound to produce a coil of a predetermined resistance.

In the accompanying drawings which illustrate one embodiment of the invention.

Fig. 1 is a plan view of a portion of a coil winding machine with mechanism embodying the present invention mounted thereon;

Fig. 2 is a front elevation thereof;

Fig. 3 is an enlarged sectional view taken on the line 3—3 of Fig. 2, and

Figs. 4 and 5 are fragmentary detail views of portions of the improved testing device.

The invention as herein illustrated and described is adapted for use in a coil winding machine such as disclosed in Patent No. 1,117,620 issued November 17, 1914, to A. H. Adams. It should be understood, however, that the present invention is capable of other applications and should be limited only by the scope of the appended claims.

Referring now to the drawings, the major part of the winding mechanism is mounted on a frame 10 which is suitably secured to the underside of a bench or table 11. A main shaft or arbor 12 is revolvably journaled in a supporting bearing 13 secured to the frame 10 and is driven by any suitable source of power (not shown). A hand wheel 14 secured to the shaft 12 assists the operator in starting the machine and also serves as a hand brake to stop the machine when it is thought that a requisite amount of wire has been wound on the core. An annular core receiving member 15 is secured to the arbor 12 on a reduced portion 16 near the inner end thereof and is insulated therefrom by a fibre washer 17 and a fibre bushing 18 as clearly illustrated in Fig. 4. The member 15 is preferably composed of bronze and is provided on its periphery with a plurality of outwardly projecting lugs 19 to each of which is secured a spring clip or wire retaining member 20. The bushing 18 is provided with a circular flanged portion 21 having a plurality of slots 22 in its periphery, each of which is in alignment with one of the wire retaining members 20.

A rod 24 is rotatably mounted in brackets 25 and 26 secured to the bearing 13 and bench 11, respectively. Adjustably secured to the rod 24 by a set screw 27 and insulated therefrom by a fibre bushing 28 is a metal member 29 to which is secured a metal brush member 30 which is adapted to be brought into contact with the member 15 by a hand rest lever 31 secured to the end of the rod 24. A tension spring 32 encircling the rod 24 and having one end attached thereto and its other end secured to the bracket 26 serves to return the member 30 to its normal position wherein it is not in contact with the member 15 (Fig. 3). The member 29 is provided with a downwardly projecting lug portion 33 which is electrically connected by a conductor 34 to a bridge circuit 35 in which is connected a galvanometer, or other suitable indicating device. A switch box 36 is supported on the bracket 26 and contained therein is a two way switch which is operated by a key 37 to determine if the coil is within its high and low resistance limits.

The core 38, upon which the wire is to be wound, is supported between a reduced portion 39 at the end of the arbor 12 and a spindle 40 journaled in a bearing 41 secured to the frame 10. The spindle 40 is adjustable longitudinally by means of a hand lever 42 to compensate for variations in the length of the core 38.

Any suitable distributing mechanism may be employed for applying the winding material evenly upon the core 38, the mechanism herein shown comprising a sheave 43 revolvably mounted at one end of a lever 44, the other end of which supports a balancing weight 45. The lever 44 is pivotally supported at 46 in a bifurcated portion 47 of a carriage member 48. By any suitable mechanism (not shown) the carriage member 48 is caused to reciprocate along a track or guideway 49 formed in the frame 10. The sheave 43 is constantly maintained at a uniform distance from the last previously applied layer of the coil during the winding operation by means of a pawl and ratchet mechanism indicated generally by the reference numeral 50 in Fig. 3.

Secured to the switch box 36 is a spring contact clip 51, the upper lip of which is provided with a knife edge 52 which serves to remove the insulation from the wire when inserted therein. The contact clip 51 is electrically connected with the bridge circuit 35 through the switch 37 (Fig. 2).

Any suitable counting mechanism 53 may be provided to register the number of turns of wire wound, thereby assisting the operator in determining approximately when wire of sufficient resistance has been wound.

Before starting to wind a coil, the counter 53 is set at zero and the operator secures the end of the supply wire in one of the clips or wire retaining members 20 as clearly indicated at 55 in Figs. 2 and 4. When it is thought that a sufficient amount of wire has been wound to produce a coil of the desired resistance, the wire leading from the supply spool is inserted in the contact clip 51 and the hand rest lever 31 is pressed downwardly to cause an electrical connection between the brush member 30 and the member 15. At the same time, the switch 37 is actuated in a well known manner to determine if the coil is within its high and low resistance limits. When the switch 37 is in one position the resistance 56 is included in the testing circuit in which case the galvanometer indicates whether or not the coil being wound is within its high resistance limit. By actuating the switch 37 to its other position the resistance 57 is included in the testing circuit instead of the resistance 56 and the galvanometer will indicate whether or not the coil is within its low resistance limits. If wire of sufficient resistance has been wound, the supply wire is cut close to the contact clip 51 and that portion of wire between the coil and the contact clip 51 is wound on the coil. If the resistance of the coil is less than required, additional wire is wound thereon and another test is made. This operation is repeated until wire of sufficient resistance has been wound on the core.

Since all parts of the improved testing device are insulated from the framework of the machine, it is apparent that a resistance measurement as accurate as possible is obtained, thereby insuring the required resistance in the coil being wound. Also, from the above description, it is evident that the present testing device does not interfere with the winding operation and since very little time is taken to make the necessary electrical connections, the required speed and efficiency of the machine is maintained.

What is claimed is:

1. In a machine for winding electrical coils of insulated wire, a core receiving member having a plurality of wire receiving and electrical contact members insulated therefrom and adapted to receive the inner end of the insulated wire of the coil being wound, a resistance measuring device having an electrical contact member adapted to receive the outer end of the wire of the coil being wound, and a hand rest lever for causing an electrical connection between one of the first-mentioned contact members and said resistance measuring device.

2. In a machine for winding electrical coils, a core receiving member having a plurality of wire receiving and electrical contact members mounted on the periphery thereof and insulated therefrom, each of said contact members being adapted to receive one end of the wire of the coil being wound, a brush member adapted to be electrically connected to said contact members, a hand rest lever for causing an electrical connection between the contact members and said brush members, a wire receiving and electrical contact member insulated from the framework of the machine and adapted to receive the other end of the wire of the coil being wound, and a resistance measuring device electrically connected to the last-mentioned contact member and said brush member.

3. In a machine for winding an electrical coil, an annular member mounted to rotate with the coil comprising a disk, a plurality of wire receiving members carried by the disk, one of which is in convenient position to insert an end of the coil in any position of the shaft, and a brush contacting with the annular member to form part of a coil testing circuit.

4. In a machine for winding an electrical coil, an annular member mounted to rotate with the coil comprising an insulating bushing surrounding the shaft, a disk member mounted on the insulating bushing, a plurality of lugs carried by the disk member, and a spring member contacting with each lug and cooperating with the lug to clamp one end of the coil in a testing circuit.

5. In a machine for winding electrical coils, an annular member mounted to rotate with the coil comprising a disk, a plurality of wire receiving members carried by the disk, one of which receiving members is in a convenient position to insert the inner end of the coil in any position of the shaft, and a brush contacting with the annular member to form a part of a coil testing circuit, and an electrical contact member adapted to receive the outer end of the coil to form another part of the coil testing circuit.

6. In a machine for winding an electrical coil, an annular member mounted to rotate with the coil comprising a disk, a plurality of wire receiving members carried by the disk, one of which is in a convenient position to insert one end of the coil in any position of the shaft, means for contacting with the annular member to form a part of a coil testing circuit, and means for connecting the other end of the coil to the coil testing circuit to test the coil being wound.

7. In a machine for winding insulated wire to form an electrical coil, a rotatable core receiving member, a disk insulated therefrom, a plurality of wire retaining members operatively associated with said disk to receive the inner end of the wire to be wound in the coil, means for contacting with wire retaining members to form a part of a coil testing circuit, and means for piercing the insulation to make contact with the outer end of the wire to complete the testing circuit.

In witness whereof, I hereto subscribe my name this 24th day of October, A. D. 1924.

CLEM H. FRANKS.